(12) United States Patent
Duan et al.

(10) Patent No.: US 7,383,616 B2
(45) Date of Patent: *Jun. 10, 2008

(54) HINGE ASSEMBLY FOR PORTABLE ELECTRONIC DEVICE

(75) Inventors: Chao Duan, Shenzhen (CN); Chia-Hua Chen, Tu-cheng (TW)

(73) Assignees: Shenzhen Futaihong Precision Industrial Co., Ltd., BaoAn District, Shenzhen, Guangdong Province (CN); Sutech Trading Limited, Road Town, Tortola (VG)

( * ) Notice: Subject to any disclaimer, the term of this patent is extended or adjusted under 35 U.S.C. 154(b) by 229 days.

This patent is subject to a terminal disclaimer.

(21) Appl. No.: 11/191,393

(22) Filed: Jul. 28, 2005

(65) Prior Publication Data

US 2006/0032020 A1 Feb. 16, 2006

(30) Foreign Application Priority Data

Jul. 30, 2004 (CN) ................ 2004 2 0072327 U

(51) Int. Cl.
  *E05F 1/08* (2006.01)
(52) U.S. Cl. ......................................... 16/303; 16/330
(58) Field of Classification Search ................ 16/330, 16/303, 305, 326; 361/680–683; 455/575.1, 455/575.4, 575.8, 550.1, 90.3; 379/433.12, 379/433.13; 348/373, 794, 333.06
See application file for complete search history.

(56) References Cited

U.S. PATENT DOCUMENTS

| 6,148,480 | A | * | 11/2000 | Cooke | 16/303 |
| 6,292,980 | B1 |   | 9/2001 | Yi et al. | 16/303 |
| 6,789,292 | B2 | * | 9/2004 | Oshima et al. | 16/297 |
| 7,007,345 | B2 | * | 3/2006 | Nakase et al. | 16/330 |
| 7,117,563 | B2 | * | 10/2006 | Chen et al. | 16/330 |
| 7,124,472 | B2 | * | 10/2006 | Duan et al. | 16/303 |
| 7,168,133 | B2 | * | 1/2007 | Luo et al. | 16/303 |
| 7,184,275 | B2 | * | 2/2007 | Yamaguchi et al. | 361/755 |
| 2003/0014840 | A1 | * | 1/2003 | Huong | 16/303 |
| 2005/0204508 | A1 | * | 9/2005 | Duan et al. | 16/303 |
| 2006/0174443 | A1 | * | 8/2006 | Takagi et al. | 16/330 |
| 2006/0242795 | A1 | * | 11/2006 | Duan et al. | 16/330 |
| 2006/0242796 | A1 | * | 11/2006 | Duan et al. | 16/330 |
| 2006/0254026 | A1 | * | 11/2006 | Duan et al. | 16/330 |

FOREIGN PATENT DOCUMENTS

JP         2003065319 A  *  3/2003

* cited by examiner

Primary Examiner—Chuck Y. Mah
(74) Attorney, Agent, or Firm—Morris Manning Martin LLP; Tim Tingkang Xia, Esq.

(57) ABSTRACT

A hinge assembly (100) for joining a cover section (110) to a body section (120) of a foldable electronic device includes a main shaft (1), a cam (2), a follower (3), a first elastic element (4), a control (5), a sleeve (6), a second elastic element (7) and a fixing element (8). The shaft has an outer thread (101) at one end and an engaging portion at an opposite end. The cam includes an end cam surface (212), and an inner thread (211). The follower includes a latching cam surface (312). The control has at least one projection (52) at one end thereof, and engages with the engaging portion. The sleeve is connected with the follower, and rotation of the sleeve is limited by the control. When the control is pushed, the hinge assembly fully opens the cover section from body section. This provides a user with convenient one-handed operation.

20 Claims, 5 Drawing Sheets

HINGE ASSEMBLY FOR PORTABLE ELECTRONIC DEVICE

FIELD OF THE INVENTION

The present invention relates to hinge assemblies, and particularly to an automatic opening hinge assembly for foldable electronic devices such as portable telephones, portable computers, and so on.

BACKGROUND OF THE INVENTION

At present, perhaps the most popular portable electronic device in the marketplace is the foldable cellular telephone, which generally includes a cover section and a body section. Typically, the cover section and the body section are rotatably interconnected through a hinge assembly, for switching the telephone between an open in-use position and a closed position.

One kind of hinge assembly employs a cam and a follower, to make the cover section open up from the body section and be held in an open position. An example of such kind of hinge assembly is disclosed in U.S. Pat. No. 6,292,980. The hinge assembly includes a cam having a concave portion, a shaft having a convex portion, and a spring which makes the concave portion tightly contact the convex portion. The cam, the shaft and the spring are received in a housing. A flip cover rotates about a main body of the mobile phone by overcoming the force of the spring, to make the concave portion rotate about the convex portion. However, a user must open the mobile phone using both hands. This makes the mobile phone awkward to utilize in situations when the user has only one hand free.

Therefore, a new hinge mechanism is desired in order to overcome the above-described shortcoming.

SUMMARY

An automatic opening hinge assembly for devices such as mobile phones is provided.

The automatic opening hinge assembly is suitable for joining a flip cover section to a body section of a foldable electronic device. A preferred embodiment of the hinge assembly includes a main shaft, a cam, a follower, a first elastic element, a control, a sleeve, a second elastic element, and a fixing element. The main shaft has an outer thread at one end thereof and an engaging portion at an opposite end thereof. The cam includes a cam surface at an one end thereof, and defines an inner thread engaging with the outer thread of the main shaft. The follower includes a latching cam surface at one end thereof, and a central hole receiving the main shaft therethrough, and at least one groove in a center thereof. The latching cam surface abuts with the cam surface of the cam. The control has at least one projection at one end thereof. The projection includes at least one block, and engages with the engaging portion. The sleeve has at least one latching portions at an outer wall thereof, for engaging with the groove of the follower. The sleeve defines a central reduced hole and at least one restraining groove at the reduced hole. The projection of the control is receivable in the reduced hole, and the block of the projection is engageable in the restraining groove under biasing by the first elastic element whereby rotation of the control relative to the sleeve is blocked. The second elastic element biases the follower. When the control is pushed, the hinge assembly fully opens the cover section from the body section. This provides a user with convenient one-handed operation of the device.

Other advantages and novel features will become more apparent from the following detailed description when taken in conjunction with the accompanying drawings, in which:

DETAILED DESCRIPTION OF THE EMBODIMENTS

Figure 1:
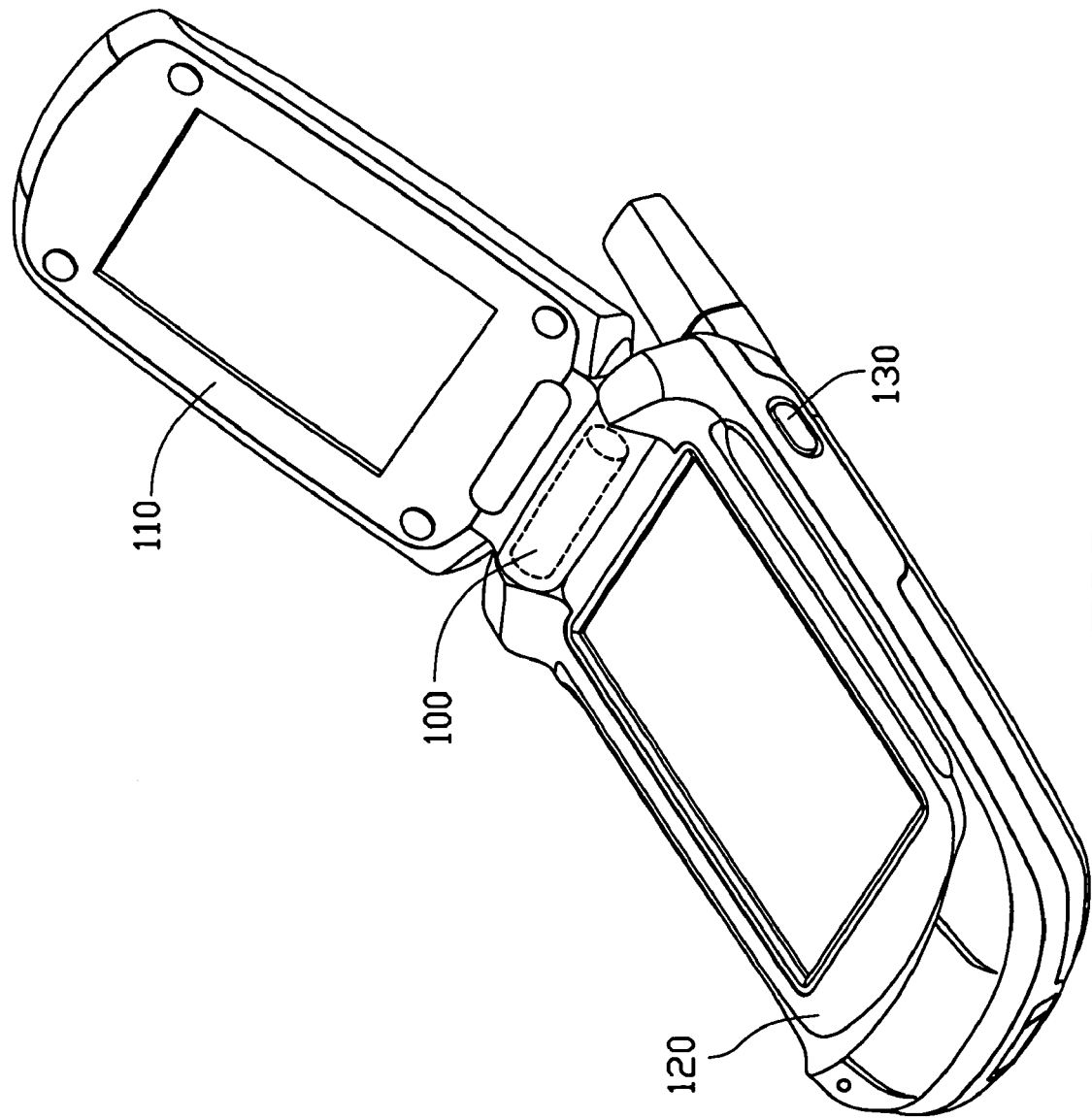
FIG. 1 is an isometric view of a mobile phone incorporating a hinge assembly according to a preferred embodiment of the present invention.

Referring now to the drawings in detail, FIG. 1 shows a hinge assembly 100 in accordance with a preferred embodiment of the present invention applied in a foldable electronic device like a flip type mobile phone. The mobile phone has a cover section 110 and a body section 120. A button 130 is disposed in one side of the body section 120. The hinge assembly 100 pivotably connects the body section 120 and the cover section 110 together.

Figure 2:
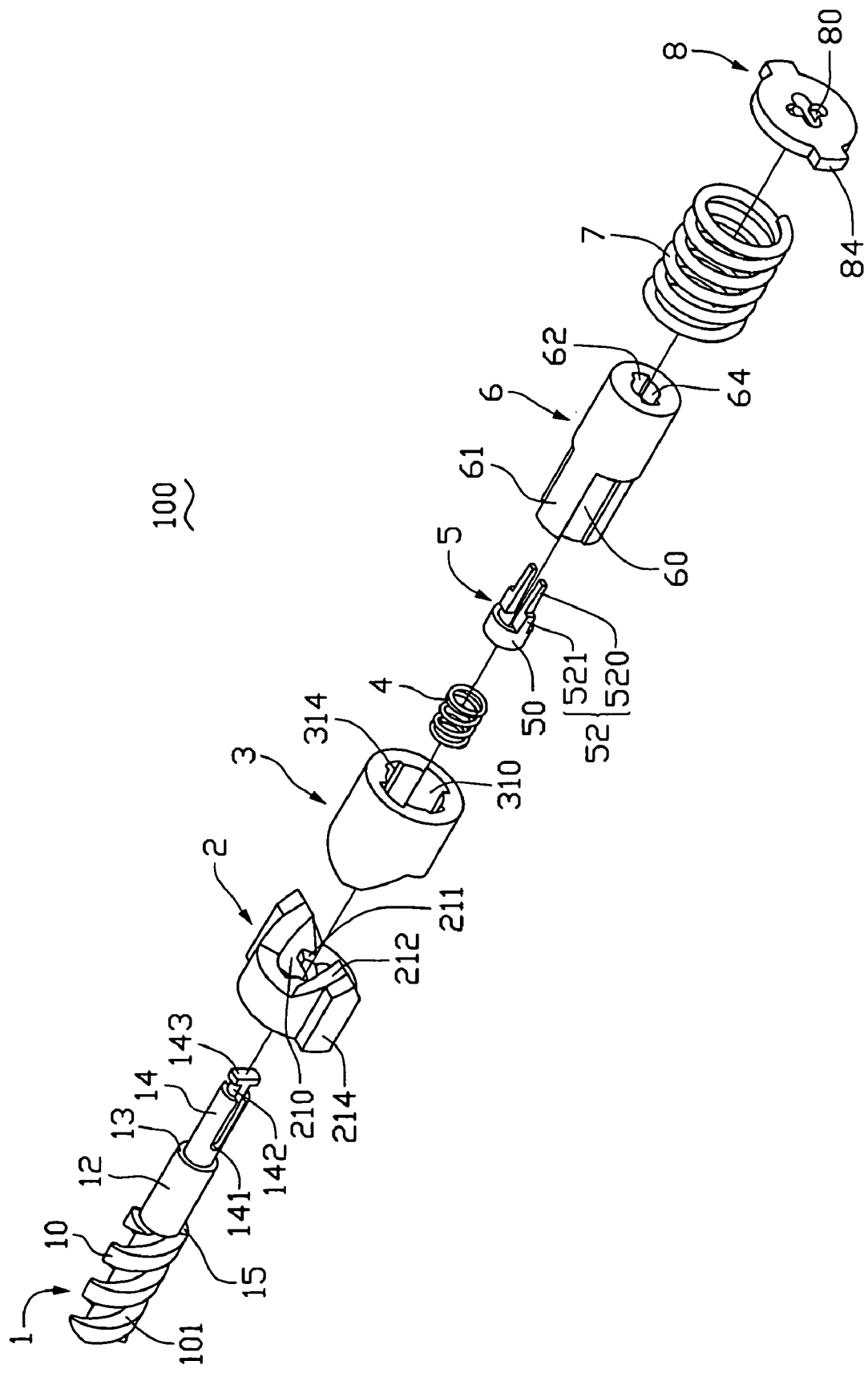
FIG. 2 is an exploded, isometric view of a preferred embodiment of a hinge assembly of the present invention.
Figure 3:
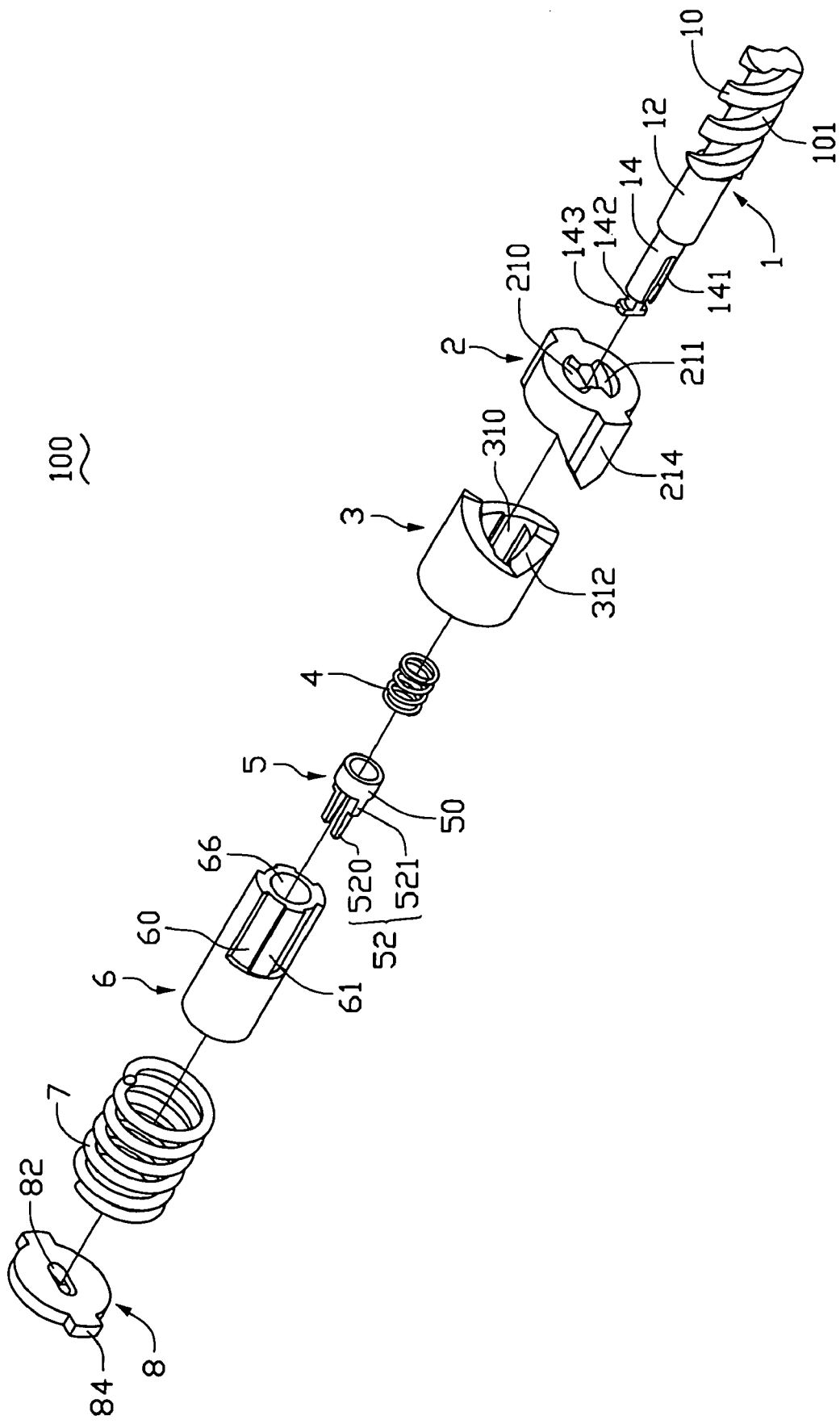
FIG. 3 is similar to FIG. 2, but viewed from another aspect.

Referring to FIG. 2 and FIG. 3, the hinge assembly 100 includes a main shaft 1, a cam 2, a follower 3, a first spring 4, a control 5, a sleeve 6, a second spring 7 and a fixing element 8. The cam 2, the follower 3, the first spring 4, the control 5, the sleeve 6 and the second spring 7 are placed to surround the main shaft 1 in that order. The fixing element 8 is locked at one end of the main shaft 1 and abuts against the second spring 7.

The main shaft 1 includes a front portion 10, a middle portion 12, and a back portion 14. The front portion 10 is disposed at one end of the main shaft 1. An outer diameter of the front portion 10 is larger than an outer diameter of the middle portion 12, thereby defining a first step 15 where the two portions 10, 12 adjoin each other. The middle portion 12 is disposed at an intermediate part of the main shaft 1. An outer thread 101 is defined in the front portion 10. The back portion 14 is disposed at an opposite end of the main shaft 1. The outer diameter of the middle portion 12 is larger than an outer diameter of the back portion 14, thereby defining a second step 13 where the two portions 12, 14 adjoin each other. The back portion 14 defines two opposite slots 141 that are parallel to a central axis thereof. A back end of the back portion 14 defines a loop groove 142, which is in communication with the slots 141. A flange 143 is formed right at the back end of the back portion 14, adjacent to the loop groove 142. The flange 143 is substantially four-sided, with two opposite sides being parallel to each other, and another two opposite sides being arcuate.

The cam 2 is substantially cylindrical. The cam 2 defines an axis hole 210 in a center thereof. An inner thread 211 is defined at an inner wall of the axis hole 210, for screw coupling with the outer thread 101 of the main shaft 1. A cam surface 212 is formed at a back end of the cam 2. The cam surface 212 defines two opposite peaks (not labeled). Two opposite protrusion blocks 214 extend from a circumferential wall of the cam 2, for engagement in the cover section 110 of the mobile phone.

The follower 3 is substantially a cylinder, and defines a central hole 310 through a center thereof. A latching cam surface 312 is formed at a front end of the follower 3. The latching cam surface 312 defines two peaks and two valleys, and has a sloped surface between each adjoining peak and valley. The peaks of the cam 2 can slide along the latching cam surfaces 312 of the follower 3. The follower 3 defines four symmetrically spaced grooves 314 in an inside wall thereof at the central hole 310.

The first spring 4 is substantially cylindrical, and is disposed around the back portion 14 of the main shaft 1. The first spring 4 is also accommodated in the sleeve 6. A front end of the first spring 4 resists the second step 13 of the main shaft 1, and an opposite rear end of the first spring 4 resists the control 5.

The control 5 is substantially a hollow cylinder. The control 5 includes a body 50, and two parallel, opposite projections 52 extending rearward from a back end of the body 50. A diameter of a central through hole of the body 50 is slightly greater than the outer diameter of the back portion 14, so that the control 5 movably fits around the back portion 14 and can slide relative to the main shaft 1. The projections 52 protrude inward toward each other beyond an inner wall of the body 50, so as to be able to engage in the slot 141 of the main shaft 1. Each projection 52 includes an engaging block 521 adjoining the body 50, and an actuating block 520 extending rearward from the engaging block 521. A width of the engaging block 521 is greater than a width of the actuating block 520. The button 130 of the mobile phone is connected with the actuating blocks 520 of the projections 52.

The sleeve 6 is substantially a hollow cylinder. The sleeve 6 includes an open front end and a half-closed rear end. The sleeve 6 defines four latching grooves 60 in a circumferential wall thereof. The latching grooves 60 are parallel to a central axis of the sleeve 6, and extend from the front end of the sleeve 6 to a middle portion of the sleeve 6. Four latching portions 61 are thus defined between the latching grooves 60. The latching portions 61 engage in the grooves 314 of the follower 3. The half-closed end defines a central reduced hole 64, and a pair of opposite restraining grooves 62 in communication with the reduced hole 64. The open end defines a central enlarged hole 66, which communicates with the reduced hole 64. The control 5 can be inserted into the enlarged hole 66, such that the engaging blocks 521 are engaged in the restraining grooves 62. An axial length of each engaging block 521 is almost the same as a corresponding length of each restraining groove 62. Further, each restraining groove 62 has a radial width, which is larger than a width of a corresponding portion of each engaging block 521. The body 50 of the control 5 resists an inner step of the sleeve 6 where the enlarged hole 66 adjoins the reduced hole 64, with the actuating blocks 520 protruding rearward out from the restraining grooves 62.

The second spring 7 is helical, and is placed around the sleeve 6. A front end of the second spring 7 resists the follower 3. When the hinge assembly is assembled, the second spring 7 exerts a predetermined pressure on the follower 3.

The fixing element 8 is substantially disk-shaped. A diameter of the fixing element 8 is equal to or larger than a diameter of the second spring 7, so that an opposite rear end of the second spring 7 can resist the fixing element 8. The fixing element 8 defines a through hole 82. A configuration of the through hole 82 matches that of the flange 143. The fixing element 8 also defines a pair of opposite engaging grooves 80 in a rear end portion thereof. The engaging grooves 80 communicate with the through hole 82, and an alignment of the engaging grooves 80 is perpendicular to a corresponding alignment of the through hole 82. Thus the flange 143 can be passed through the through hole 82, rotated 90 degrees, and engaged in the engaging grooves 80, whereby the fixing element 8 is locked in the loop groove 142. Two opposite projection blocks 84 extend radially outwardly from a circumferential wall of the fixing element 8, for attaching the fixing element 8 to the body section 120.

Figure 4:
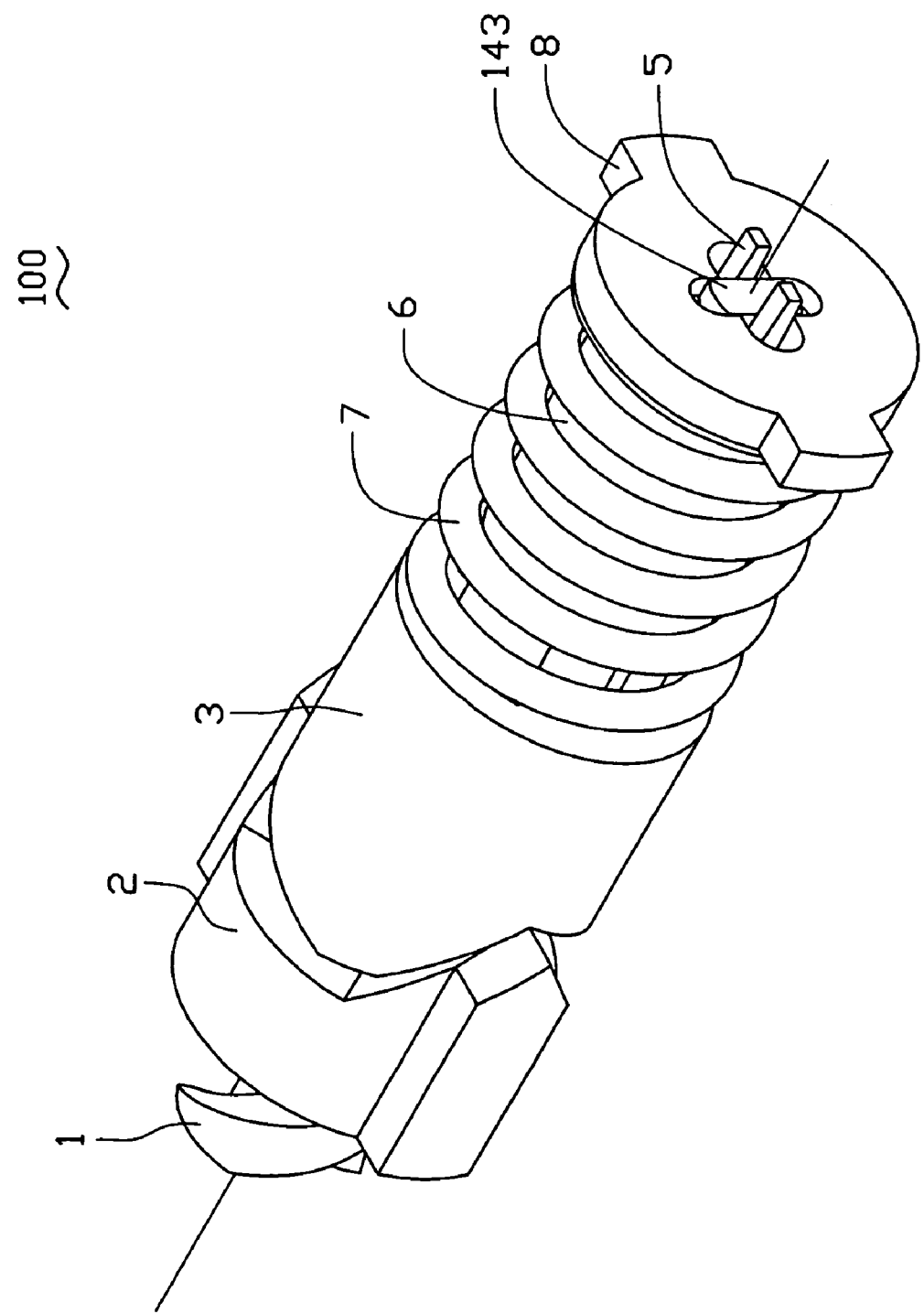
FIG. 4 is an enlarged, assembled view of the hinge assembly shown in FIG. 2.
Figure 5:
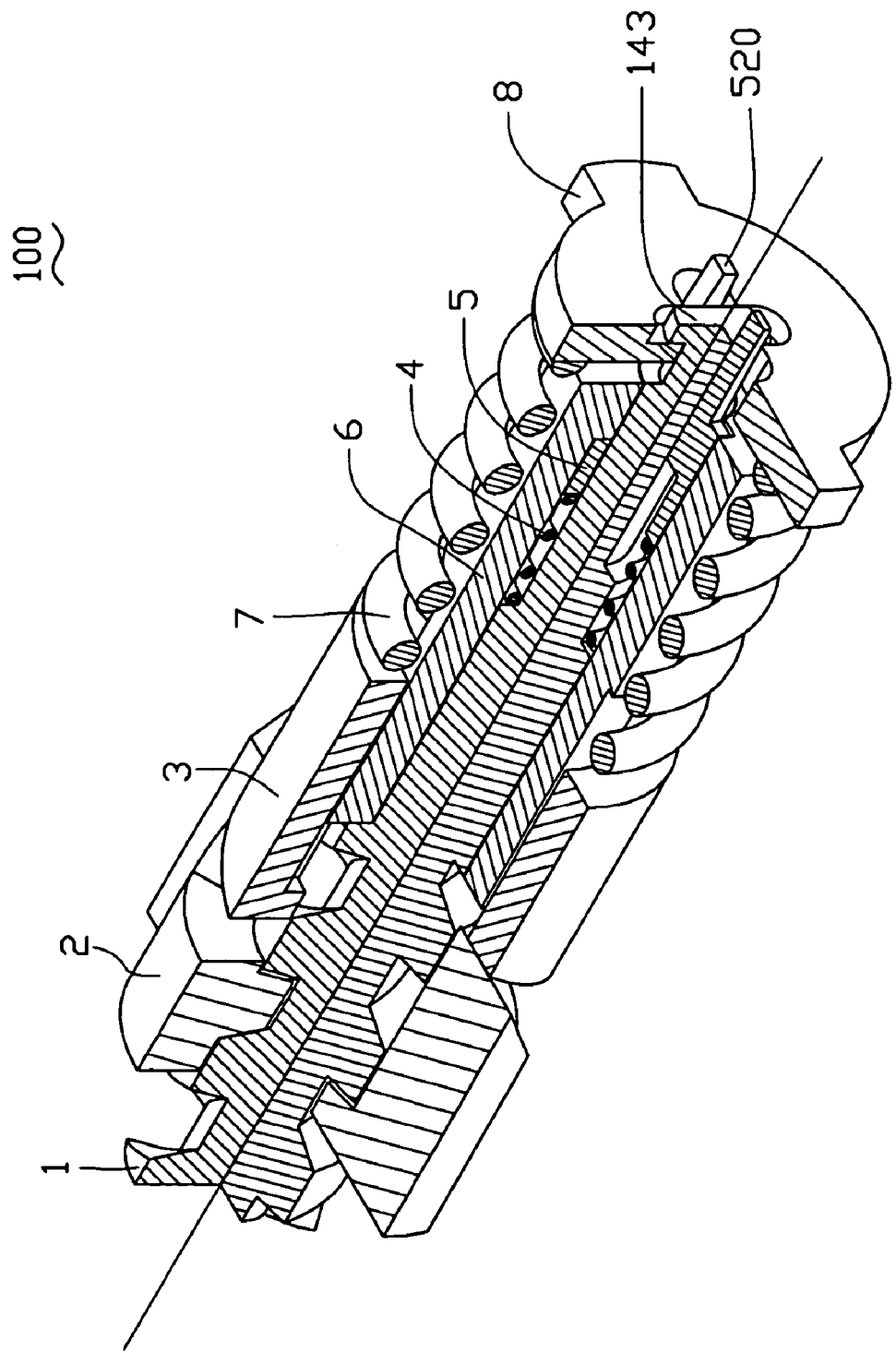
FIG. 5 is a cut-away view of FIG. 4.

In assembly, referring to FIG. 4 and FIG. 5, the cam 2 is placed around the main shaft 1, and the inner thread 211 of the cam 2 is engaged with the outer thread 101 of the front portion 10. Then, the follower 3 is placed around the main shaft 1, and the latching cam surface 312 of the follower 3 is mated with the cam surface 212 of the cam 2. Next, the first spring 4 and the control 5 are placed around the back portion 14 of the main shaft 1. The projections 52 are slidably engaged in the slots 141 of the back portion 14. After that, the front end of the sleeve 6 is inserted into the central hole 310 of the follower 3, with the latching portions 61 being received in the grooves 314. The follower 3 thus cannot rotate relative to the sleeve 6. The engaging blocks 521 are situated in the restraining grooves 62, with the actuating blocks 520 protruding rearward out from the restraining grooves 62. The front end of the sleeve 6 resists the first step 15 of the main shaft 1. Then the second spring 7 is placed around the sleeve 6. The flange 143 is passed through the through hole 82 of the fixing element 8, and the fixing element 8 is rotated 90 degrees, thereby locking the fixing element 8 with the main shaft 1.

The duly assembled hinge assembly 100 is then received in the cover section 110 and the body section 120. Accordingly, the cam 2 can rotate together with the cover section 110. The actuating blocks 520 are connected with the button 130 of the mobile phone, with the button 130 being exposed outside of the body section 120.

In use, when a user wants to open the cover section 110 of the mobile phone, he/she holds the body section 120 of the mobile phone and presses the button 130. The button 130 pushes the control 5, and forces the control 5 to slide along an axial direction relative to the body section 120. Accordingly, the engaging blocks 521 exit from the restraining grooves 62, and the sleeve 6, the follower 3 and the cam 2 are freed from restriction by the control 5. Because the second spring 7 exerts the predetermined pressure on the follower 3, the second spring 7 now pushes the follower 3, and the follower 3 pushes the cam 2 in turn. Therefore, the cam 2 rotates along the outer thread 101 of the main shaft 1. Accordingly, the cover section 110 is also brought to rotate up relative to the body section 120.

During the cam 2 rotating, the sleeve 6 rotates accordingly. The sleeve 6 brings the control 5 to move axially, and the first spring 4 is compressed. Once the restraining grooves 62 of the sleeve 6 have rotated a certain degree, the first spring 4 is able to decompress, and the engaging blocks 521 again engage in the restraining grooves 62. The sleeve 6 stops rotating, and the follower 3 and cam 2 also stop rotating accordingly. Thus the cover section 110 also stops rotating. At this position, the cover section 110 is completely opened relative to the body section 120, and is in a stable state. The degree of opening of the cover section 110 is proportional to the width of each restraining groove 62. Thus the width of each restraining groove 62 is configured so that the cover section 110 opens to a desired angle relative to the body section 120, whereupon the engaging blocks 521 again engage in the restraining grooves 62.

When the mobile phone is closed, the user rotates the cover section 110 in a closing direction relative to the body section 120. The cover section 110 drives the cam 2 to rotate.

The engaging blocks 521 are engaged in the restraining grooves 62, therefore the follower 3 is limited by the control 5. The follower 3 cannot rotate, but instead axially moves along the main shaft 1. The second spring 7 is thereby compressed. Once the peaks of the cam surface 212 have ridden over the peaks of the latching cam surface 312 of the follower 3, the user releases the cover section 110. The second spring 7 is able to decompress, and drives the peaks of the cam surface 212 to move into the corresponding valleys of the latching cam surface 312. That is, the cover section 110 is automatically rotated back to the fully closed position.

As described above, the preferred embodiment provides an automatically opening hinge assembly for devices such as mobile phones. When the button is pushed, the hinge assembly fully opens the cover section from the body section. This provides the user with convenient one-handed operation of the device.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

The invention claimed is:

1. An automatic opening hinge assembly for joining a flip cover section to a body section of a foldable electronic device, comprising:
   a main shaft having an outer thread at one end thereof, and an engaging portion at an opposite end thereof;
   a cam comprising a cam surface at an one end thereof, the cam defining an inner thread engaging with the outer thread of the main shaft;
   a follower comprising a latching cam surface at one end thereof, a central hole receiving the main shaft therethrough, and at least one groove at the central hole, the latching cam surface abutting the cam surface of the cam;
   a first elastic element;
   a control having at least one projection at one end thereof, the projection comprising at least one block and engaging with the engaging portion of the main shaft;
   a sleeve having at least one latching portion at an outer wall thereof, and defining a central reduced hole and at least one restraining groove at the reduced hole, the latching portion engaging in the groove of the follower, the projection of the control being receivable in the reduced hole, and the block of the projection being engageable in the restraining groove under biasing by the first elastic element whereby rotation of the control relative to the sleeve is blocked; and
   a second elastic element for biasing the follower.

2. The hinge assembly as claimed in claim 1, wherein the main shaft comprises a front portion, a middle portion, and a back portion, the front portion has the outer thread, and the back portion has the engaging portion.

3. The hinge assembly as claimed in claim 2, wherein a first step is defined where the front portion adjoins the middle portion, and a second step is defined where the middle portion adjoins the back portion.

4. The hinge assembly as claimed in claim 3, wherein one end of the sleeve resists the first step of the main shaft.

5. The hinge assembly as claimed in claim 4, wherein one end of the first elastic element resists the second step.

6. The hinge assembly as claimed in claim 1, wherein the opposite end of the main shaft defines a flange.

7. The hinge assembly as claimed in claim 1, wherein the control comprises a body, and the projection extends from one end of the body.

8. The hinge assembly as claimed in claim 7, wherein the projection protrudes radially inward beyond an inner wall of the body.

9. The hinge assembly as claimed in claim 8, wherein the block of the projection comprises an engaging block and an actuating block connected with the engaging block, the engaging block being engageable in the restraining groove, and the actuating block protruding out from an end of the sleeve.

10. The hinge assembly as claimed in claim 1, further comprising a fixing element, the fixing element engaging with the opposite end of the main shaft.

11. The hinge assembly as claimed in claim 10, wherein the fixing element defines an axial through hole and at least one transverse engaging groove, an orientation of the engaging groove being perpendicular to an orientation of the through hole.

12. The hinge assembly as claimed in claim 11, wherein at least one projection block is disposed at a circumferential wall of the fixing element.

13. The hinge assembly as claimed in claim 1, wherein the first elastic element and the second elastic element are springs.

14. A foldable electronic device having at least two components hinged together by a hinge assembly, said hinge assembly comprising:
   a main shaft having an outer thread at one end thereof
   a cam comprising a surface at one end thereof, the cam defining an inner thread engaging with the outer thread of the main shaft;
   a follower comprising a latching surface at one end thereof, and a central hole receiving the main shaft therethrough, the latching surface abutting the surface of the cam;
   a first elastic element located around the main shaft;
   a control abutting against the first elastic element, and being engaged with the main shaft but only linearly moveable relative to the main shaft;
   a sleeve located around the main shaft and non-rotatable relative to the follower, the control releasably engaged with the sleeve; and
   a second elastic element for biasing the follower; wherein when the control is axially moved to a first axial position to compress the first elastic element, one end of the control is released from the sleeve so as to allow the sleeve with the cam and the follower to be rotated relative to the main shaft by means of a biasing force exerted on the follower by the second elastic element, and the first elastic element biases the control; and when the sleeve reaches a predetermined location relative to the control, the control is axially moved to a second axial position and said one end of the control is releasably locked in the sleeve by means of a biasing force exerted on the control by the first elastic element, and the sleeve with the cam and the follower stop rotating.

15. The foldable electronic device as claimed in claim 14, wherein the control comprises two projections symmetrically opposite each other across a central axis of the control, each projection comprises an engaging block and an actuating block extending from the engaging block, the sleeve defines two restraining grooves, and the engaging blocks are releasably engaged in the restraining grooves and the actuating blocks protrude out from one end of the sleeve when the control is releasably engaged with the sleeve.

16. A foldable electronic device comprising:
a first component of said foldable electronic device comprising a main shaft disposed therein and movable along therewith;
a second component of said foldable electronic device comprising a cam disposed therein and movable along therewith, said cam movably engagable with said main shaft to connect said first component with said second component such that said second component is rotatable relative to said first component, and movement of said cam being simultaneously axial along said main shaft and rotary about said main shaft due to threaded engagement thereof with said main shaft;
a follower disposed next to said cam and movable between a first position and a second position along said main shaft in said foldable electronic device;
an elastic element for biasing said follower toward said cam; and
a control disposed substantially inside said follower and engaged with said main shaft such that said control is slidable but non-rotatable relative to said main shaft, said control operatively coupled to said follower such that said control is disengagable from said follower so as to release said follower to automatically move axially and rotarily together with said cam from said second position to said first position under an axial push force exerted by said elastic element and thereby move said second component away from said first component.

17. The foldable electronic device as claimed in claim 16, wherein said main shaft defines an outer thread to engage with an inner thread of said cam to constitute said threaded engagement so as to guide said simultaneous axial and rotary movement of said cam along and about said main shaft.

18. The foldable electronic device as claimed in claim 16, wherein said follower comprises a follower body and a sleeve engaged with said follower body and movable together with said follower body and used to perform said operative coupling of said control to said follower.

19. The foldable electronic device as claimed in claim 18, wherein said control comprises two projections symmetrically opposite each other across a central axis of said control, each projection comprises an engaging block and an actuating block extending from the engaging block, and the engaging blocks are releasably engaged with said sleeve.

20. The foldable electronic device as claimed in claim 19, further comprising another elastic element biasing said control, wherein said sleeve defines two restraining grooves, and when said follower reaches said second position, said another elastic element pushes said control and the engaging blocks are received in the restraining grooves and thereby said control is releasably locked in said sleeve.

* * * * *